United States Patent
Kim et al.

(10) Patent No.: US 7,333,651 B1
(45) Date of Patent: Feb. 19, 2008

(54) METHOD AND APPARATUS FOR MEASURING SIMILARITY USING MATCHING PIXEL COUNT

(75) Inventors: Hyoung Gon Kim, Seoul (KR); Sung Min Chu, Seoul (KR); Sang Chul Ahn, Seoul (KR); Nam Kyu Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/623,516

(22) PCT Filed: Apr. 13, 1999

(86) PCT No.: PCT/KR99/00174

§ 371 (c)(1),
(2), (4) Date: Oct. 4, 2000

(87) PCT Pub. No.: WO99/53681

PCT Pub. Date: Oct. 21, 1999

(30) Foreign Application Priority Data

Apr. 13, 1998 (KR) .................................. 98-13970

(51) Int. Cl.
*G06K 9/00* (2006.01)
*G06K 9/36* (2006.01)

(52) U.S. Cl. .................. 382/154; 345/419; 356/12; 382/285

(58) Field of Classification Search ............. 382/154, 382/285; 345/419–427; 356/12–14
See application file for complete search history.

(56) References Cited

U.S. PATENT DOCUMENTS

| | | | | |
|---|---|---|---|---|
| 4,745,562 A | * | 5/1988 | Prazdny | 702/71 |
| 4,825,393 A | * | 4/1989 | Nishiya | 702/152 |
| 5,734,743 A | * | 3/1998 | Matsugu et al. | 382/154 |
| 6,125,198 A | * | 9/2000 | Onda | 382/154 |
| 6,141,440 A | * | 10/2000 | Melen | 382/154 |
| 6,215,899 B1 | * | 4/2001 | Morimura et al. | 382/154 |
| 6,314,211 B1 | * | 11/2001 | Kim et al. | 382/285 |
| 6,606,406 B1 | * | 8/2003 | Zhang et al. | 382/154 |
| 2002/0012459 A1 | * | 1/2002 | Oh | 382/154 |

FOREIGN PATENT DOCUMENTS

| | | |
|---|---|---|
| DE | 4444697 A | 6/1996 |
| JP | 09-204524 A | 8/1997 |

* cited by examiner

*Primary Examiner*—Aaron W Carter
(74) *Attorney, Agent, or Firm*—Bacon & Thomas, PLLC

(57) ABSTRACT

A stereo disparity between a reference image and a search image for a reference pixel in the reference image is determined by (a) calculating a similarity measure between a reference window including a set of pixels centering on the reference pixel and each of a group of search windows in the search image which is of a same shape with the reference window and displaced from the reference window within a predetermined search range, wherein a matching pixel count, which is the number of pixels in the reference window which are similar in intensity to corresponding pixels in a search window, is used as the similarity measure between the reference window and the search window; and (b) determining a displacement between the reference window and a search window which yields a largest similarity measure as the stereo disparity for the reference pixel.

12 Claims, 14 Drawing Sheets

SEARCH IMAGE

REFERENCE IMAGE $V(x,y,d) = V(x,y-1,d) + T(x,y+wy,d) - T(x,y-1-wy,d)$ $MPC(x,y,d) = MPC(x-1,y,d) + V(x+wx,y,d) - V(x-wx-1,y,d)$

METHOD AND APPARATUS FOR MEASURING SIMILARITY USING MATCHING PIXEL COUNT

TECHNICAL FIELD

The present invention relates to digital image processing and, more particularly, to a method and apparatus for measuring similarity between pixels in two different images.

BACKGROUND ART

Stereo disparity estimation is one of the most active research areas in the field of three-dimensional or stereo vision. Stereo disparity is the spatial offset or displacement between two matching pixels, where one pixel is in a reference image, the other pixel is in a search image, and both pixels correspond to the same point in physical space. The reference and search images are the images viewed by the left and right eyes, respectively.

In order to determine the pixel in the search image which matches a given pixel in the reference image, the coordinates of the pixels in the two images must first be established. A similarity measure is then computed between pixels in a window of predetermined size centered at the given pixel in the reference image (i.e., the reference pixel) and pixels that are candidates to match the reference pixel in a window of the same size centered at each candidate pixel in the search image. The pixel in the search image that yields the greatest value of the similarity measure is considered to be the pixel that matches the reference pixel.

A disparity map for the reference image is obtained by computing the similarity measure between a reference pixel and each candidate matching pixel in a search range for every pixel in the reference image. Generation of the disparity map is greatly simplified by imposition of the "epipolar constraint" on the candidate matching pixels, whereby the candidate matching pixels are limited to those which lie on the same horizontal line as the reference pixel.

FIG. 1 illustrates matching subject to the epipolar constraint. To determine the pixel in the search image that most closely matches the starred reference pixel, the similarity measure is computed for a window centered at the reference pixel and a window in the search image centered at a candidate matching pixel as the window in the search image is moved along a horizontal line within a search range. The candidate search pixel that yields the greatest value of the similarity measure is considered to be the pixel that matches the reference pixel. The spatial displacement between the matching pixel from the reference pixel is the stereo disparity for the reference pixel.

Similarity measures typically used to determine matching pixels include the sum of squared differences (SSD), the sum of absolute differences (SAD), and the normalized cross correlation (NCC). For each of these similarity measures, the contribution of a given search pixel to the disparity map depends on the light intensity at the given search pixel. The disparity boundary between a region within which there are large variations in light intensity therefore tends to extend into any adjacent region within which there are small variations in light intensity. This phenomenon, known as "boundary overreach", generates misleading disparity values near the boundary of an object.

DISCLOSURE OF INVENTION

An object of the present invention is accordingly to suppress boundary overreach in the estimation of stereo disparity by providing a similarity measure based on a matching pixel count ("MPC"), the number of search pixels having similar intensity values, rather than on the light intensity at each of the search pixels. Another object of the present invention is to provide an apparatus for estimating stereo disparity that efficiently implements the above method in real time.

One embodiment of the present invention is a method for determining the stereo disparity between a reference image and a search image for a reference pixel in the reference image, the method comprising the steps of:

(a) calculating a similarity measure between a reference window in the reference image, which reference window includes a set of pixels centered at the reference pixel, and each of a plurality of search windows in the search image, each of which search windows has the same shape as the reference window and is displaced from the reference window within a predetermined search range, wherein a matching pixel count, the number of pixels in the reference window at which the light intensity is similar to the light intensity at the corresponding pixels in the search window, is used as the similarity measure between the reference window and the search window; and (b) determining a displacement between the reference window and a search window which yields the greatest value of the similarity measure as the stereo disparity for the reference pixel.

Another embodiment of the present invention is an apparatus for determining the stereo disparity between a reference image and a search image for a reference pixel in the reference image, the apparatus comprising:

(a) first means for calculating a similarity measure between a reference window in the reference image, which reference window includes a set of pixels centered at the reference pixel, and each of a plurality of search windows in the search image, each of which search windows has the same shape as the reference window and is displaced from the reference window within a predetermined search range, wherein a matching pixel count, which is the number of pixels in the reference window which are similar in intensity to corresponding pixels in a search window, is used as the similarity measure between the reference window and the search window; and (b) second means for determining a displacement between the reference window and a search window which yields a largest value of the similarity measure as the stereo disparity for the reference pixel, wherein R(x,y) denotes the reference pixel, the reference window includes Wx*Wy pixels centered at R(x,y), Wx and Wy being predetermined numbers, each of the search windows includes Wx*Wy pixels centered at L(x+d, y) which is a pixel in the search image, d ranging from 0 to a predetermined number Sr, and the first means includes:

(a1) a P-unit for calculating P(x,y,d), where:
P(x,y,d)=1, if abs($B_R$(x,y)−$B_L$(x+d,y))≦Th and
P(x,y,d)=0, otherwise, where $B_R$(x,y) and $B_L$(x+d,y) denote the intensity values at R(x,y) and L(x+d,y), respectively, and Th is a predetermined threshold value;

(a2) a P-buffer for storing P(x,y,d) values calculated by the P-unit; and (a3) third means for determining MPC(x,y,d) values for d=0 to Sr as follows:

$$MPC(x, y, d) = \sum_w P(x, y, d)$$

where w denotes the reference window and a search window; and the second means includes means for selecting a d value which yields a largest MPC(x,y,d) value as the stereo disparity for R(x,y).

BEST MODE FOR CARRYING OUT THE INVENTION

In the method described and claimed in the present application, a matching pixel count ("MPC") is used as a measure of the similarity between a reference window in a reference image and each of a plurality of search windows in a search image. The contribution of a given matching pixel in the search image to the similarity measure is taken to be the same irrespective of the intensity at the given matching pixel in order to ensure an accurate result near the boundary of the image. MPC is computed by counting the number of pixels in a window in one image whose corresponding pixels in another image have similar intensity values.

When the reference and search windows satisfy the epipolar constraint, MPC(x, y, d) denotes the similarity between a reference window centered at R(x, y) and a search window centered at L(x+d, y), where R(x, y) is a pixel in the reference image located at (x, y) and L(x+d, y) is a pixel in the search image located at (x+d, y). MPC(x, y, d) is defined by:

$$MPC(x, y, d) = \sum_w P(x, y, d) \quad (1)$$

where P(x,y,d)=1, if abs[$B_R$(x,y)−$B_L$(x+d,y)]≦Th
=0, otherwise;

abs(•) denotes the absolute value; $B_R$ (x,y) and $B_L$(x+d,y) denote the intensity at R(x, y) and L(x+d, y), respectively; W denotes a matching window of size (Wx*Wy),a group of pixels centered at either R(x, y) in the reference image or L(x+d, y) in the search image; and Th is a predetermined threshold value.

P(x, y, d) is thus set equal to one if intensity values at corresponding pixels, i.e., R(x, y) and L(x+d, y), in the two images are similar, and zero otherwise. To determine the disparity for a reference pixel R(x, y), MPC(x, y, d) is computed for all values of d in a search range (d=0 to Sr) and the disparity is defined to be the value of d that yields the greatest value of MPC(x, y, d).

Figure 1:
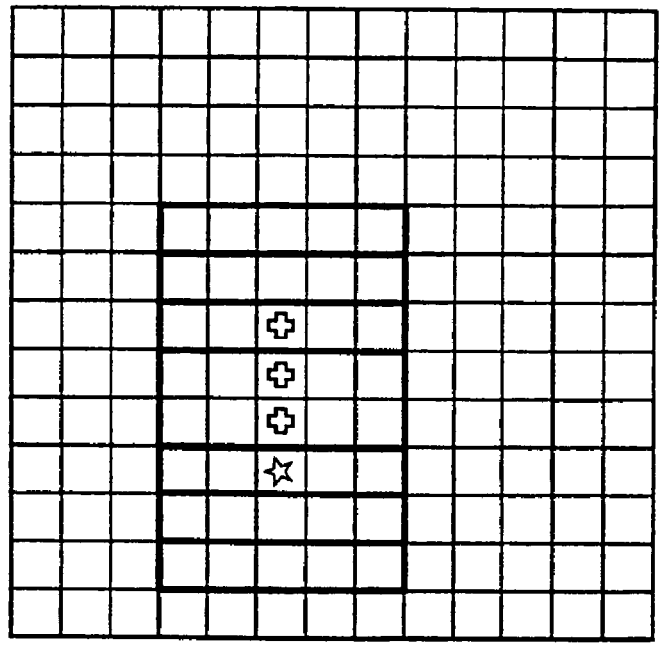
FIG. 1 illustrates matching subject to an epipolar constraint.
Figure 1:
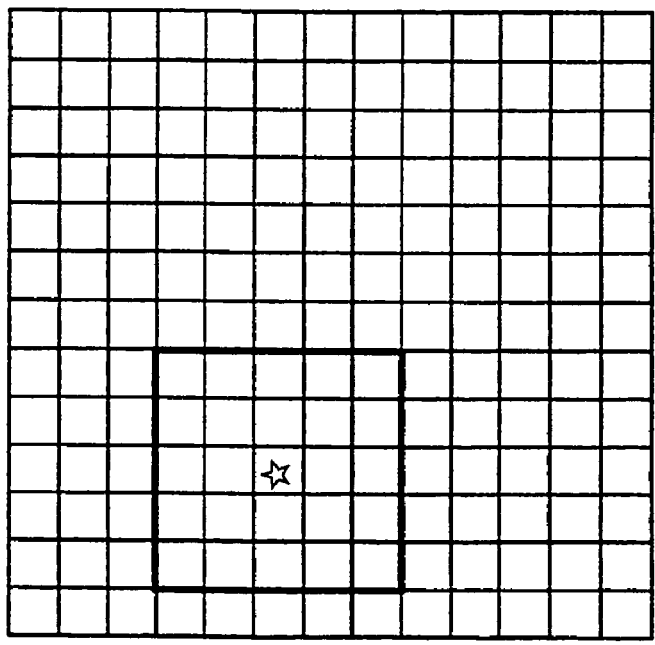
Figure 2:
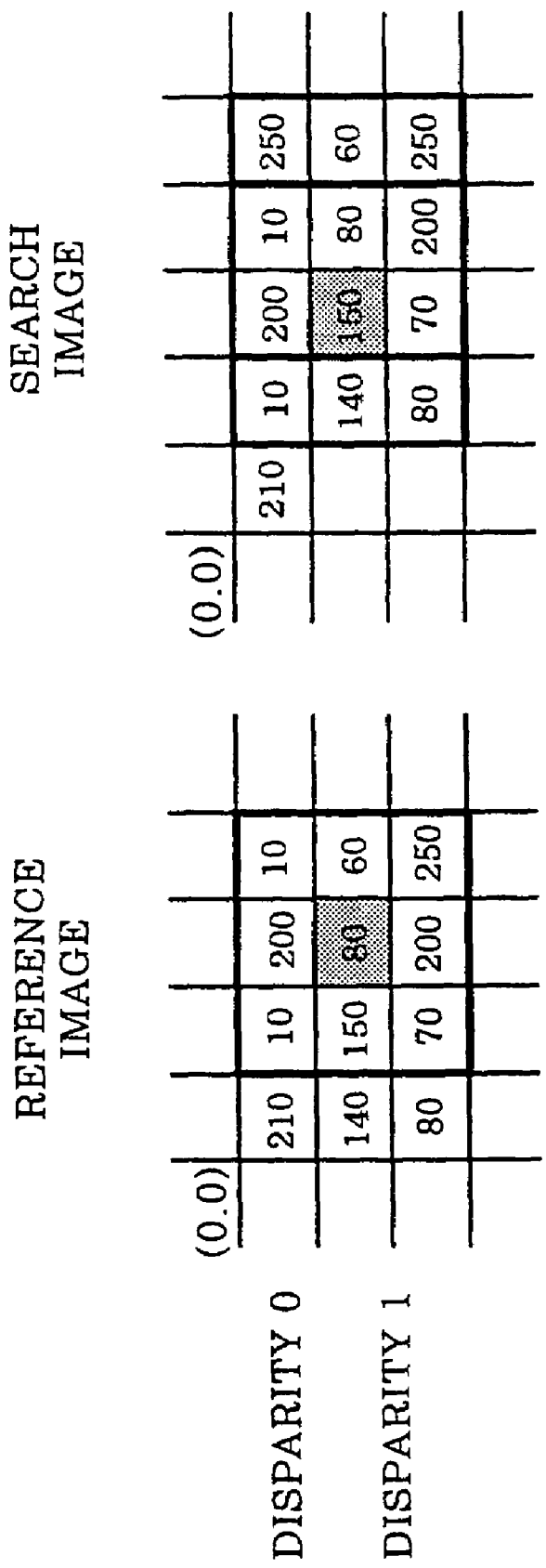
FIG. 2 illustrates the comparative performance of the SAD and MPC similarity measures.

FIG. 2 illustrates a comparison of SAD and MPC similarity measures. A comparison of the intensity values of pixels in the reference image with the intensity values of pixels in the search image shows that the disparity of the three upper pixels in the reference image, which have intensity values of 10, 200, and 10, is zero and the disparity of the six lower pixels in the reference image, which have intensity values of 150, 80, 60, 70, 200 and 250, is one.

To determine the disparity of the pixel with an intensity value of 80 (the "reference pixel"), a similarity measure (either SAD or MPC) between a window in the reference image (the "reference window") and each window in the search image ("search window") is computed and the search window most similar to the reference window is selected. The displacement between the reference window and the selected search window is the disparity between the two images for the reference pixel. For sake of simplicity, only two search windows are shown in FIG. 2.

In the SAD method, SAD(3,2,0) and SAD(3,2,1) are given by:
SAD(3,2,0)=abs(10−10)+abs(200−200)+abs(10−10)
  +abs(140−150)+abs(150−80)+abs(80−60)
  +abs(80−70)+abs (70−200)+abs (200−250)
=290 and
SAD(3,2,1)=abs(200−10)+abs(10−200)+abs(250−10)
  +abs(150−150)+abs(80−80)+abs(60−60)
  +abs(70−70)+abs(200−200)+abs(250−250)
=620.

In SAD(3,2,0) and SAD(3,2,1), 3 and 2 are the x and y coordinates, respectively, of the reference pixel and 0 or 1 is the disparity between reference and search windows for which the SAD is computed. The disparity for the reference pixel in the SAD method is the displacement that yields the smallest SAD value (i.e., 0).

In the MPC method, MPC(3,2,0) and MPC(3,2,1) are given by:
MPC(3,2,0)=1+1+1+0+0+0+0+0+0=3
MPC(3,2,1)=0+0+0+1+1+1+1+1+1=6

The disparity for the reference pixel in the MPC method is the displacement that yields the largest MPC value (i.e., 1).

In this example, the SAD measure yields a misleading disparity value, because the upper three pixels in the reference window, which exhibit a large variance in their intensity values, have a greater effect on the similarity measure than do the lower six pixels, which exhibit a small variance.

Figure 3A:
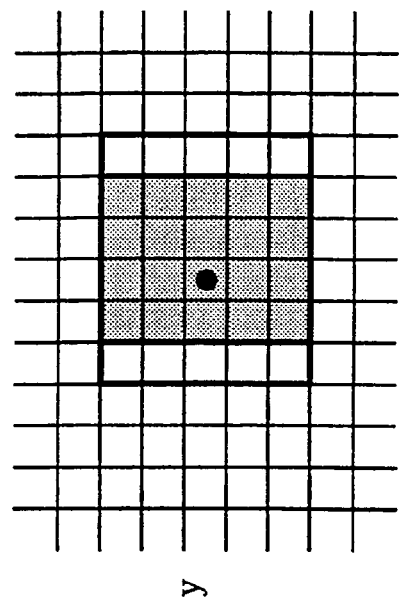
FIGS. 3A and 3B illustrate redundant operations involved in determining the MPC similarity measure.
Figure 3A:
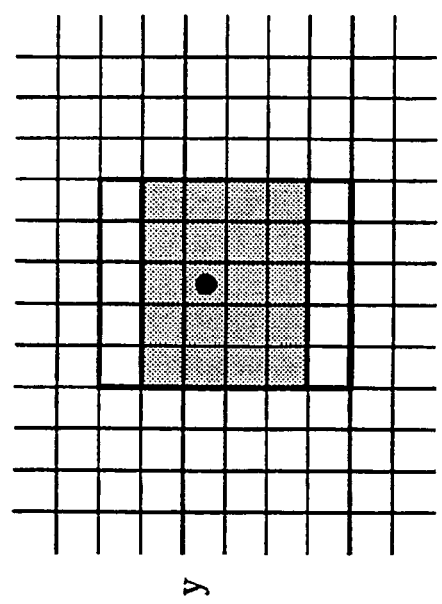
Figure 3B:
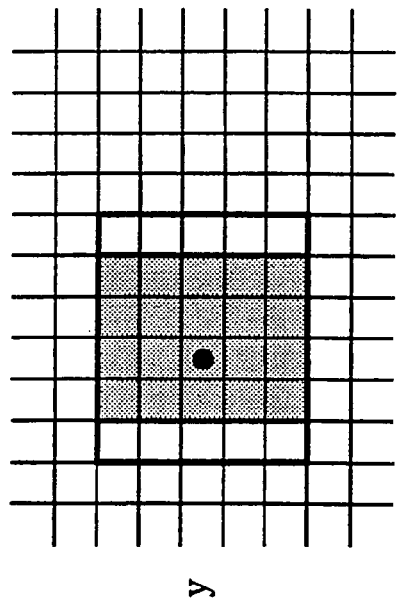
Figure 3B:
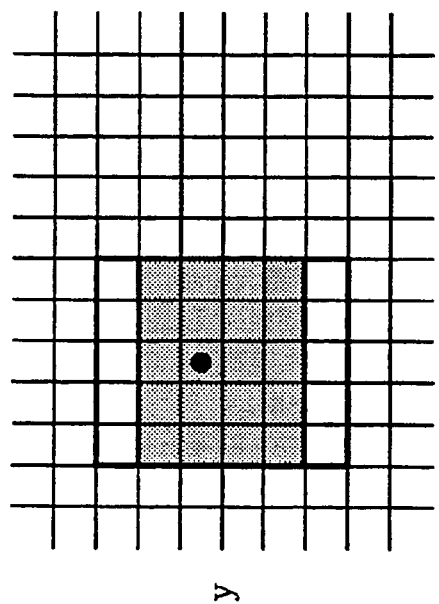

FIGS. 3A and 3B illustrate redundant operations which are inherent in the computation of the MPC measure. Despite the epipolar constraint, the amount of computation required to determine MPC values for all pixels in the reference image is proportional to (Ix*Iy)*(Wx*Wy)*Sr, where (Ix*Iy) is the size of an image, (Wx*Wy) is the size of a window, Wx and Wy being odd numbers, and Sr is a search range. The enormous amount of computation required is due to the redundant operations which are inherent in the MPC method.

As shown in FIG. 3A, after the MPC value between R(x, y) and L(x+d, y) has been determined, the computation corresponding to the overlapping area of the two horizontally displaced windows would be redundant when determining the MPC value between R(x+1, y) and L(x+1+d, y). Similarly, when determining the MPC value between R(x, y+1) and L(x+d, y+1), the computation corresponding to the overlapping area of two vertically displaced windows in FIG. 3B would be redundant.

By using buffers to store the results of computation, these redundant operations can be avoided so that the amount of computation can be reduced to (Ix*Iy)*Sr, irrespective of the size of a window.

Figure 4A:
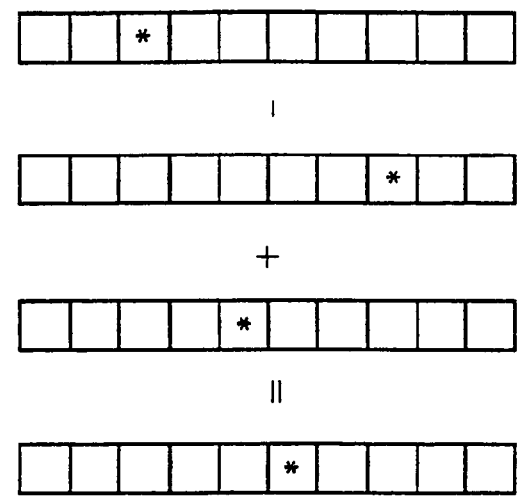
FIGS. 4A and 4B illustrate a method of determining the MPC similarity measure from which redundant operations have been eliminated.
Figure 4B:
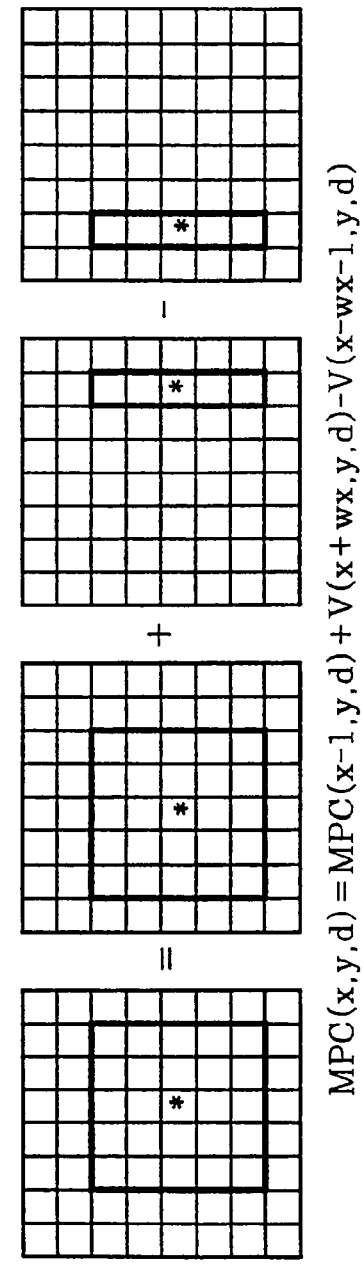

FIGS. 4A and 4B illustrate a method of computing MPC values from which these redundant computations have been eliminated. For sake of simplicity, only pixels in the reference image are shown. V(x, y, d) represents a matching pixel count between two vertical segments which are a group of Wy pixels centered at R(x, y) and L(x+d, y). MPC(wx, y, d) is computed by summing V values as follows:

$$MPC(xw, y, d) = \sum_{i=-wy}^{wy} V(wx + i, y, d) \quad (2)$$

For x larger than wx, MPC(x,y,d) can be computed from a previously computed MPC value (i.e., MPC(x−1,y,d)) as follows:

$$MPC(x,y,d)=MPC(x-1,y,d)+V(x+wx,y,d)-V(x-1-wx,y,d) \quad (3)$$

In Equations (2) and (3), wx and wy denote distances from the center to the boundary of a window in the horizontal and vertical directions, respectively:

$$wx=(Wx-1)/2 \text{ and } wy=(Wy-1)/2 \quad (4)$$

In a similar manner, a first V value in a column, V(x,wy, d), is computed by summing P(•) for a vertical segment:

$$V(x, wy, d) = \sum_{i=-wy}^{wy} p(x, wy + i, d) \quad (5)$$

where P(x, y, d) has the value one if values of R(x, y) and L(x+d,y) are similar and has the value zero otherwise as defined in Equation. (1). For values of y greater than wy, V(x,y,d) can be computed by using a previously computed V value, V(x,y−1,d):

$$V(x,y,d)=V(x,y-1,d)+P(x,y+wy,d)-P(x,y-1-wy,d) \quad (6)$$

At the beginning of stereo disparity estimation for a reference image and a search image, V(x,wy,d), which represents the similarity between vertical segments centered at R(x, wy) and L(x+d, wy), is computed for all values of x and d (i.e., from x=0 to x=Ix-1 and from d=0 to d=Sr) according to Equation. (5). In other words, as many as (Sr+1) V values, V(x,wy,0), V(x,wy,1), . . . , V(x,wy,Sr), are computed for each x. The computed V values are stored in a V buffer which can store Ix*(Sr+1) V values.

In Equation (2), MPC(wx,y,d) represents the similarity between a window centered at R(wx,y) in the reference image and a window centered at L(wx+d,y) in the search image. A buffer for storing a MPC value is initialized with a sum of V(wx+i,y,d) values for I=−wx to wx. The initialization of the MPC buffer is done for a (wx)th pixel in each row.

For values of x greater than wx, MPC(x,y,d) is computed by using MPC(x−1,y,d), the MPC for the previous pixel in the same row, which is stored in the MPC buffer, as shown in Equation (3) and FIG. 4A. Specifically, V(x+wx,y,d), a V value for a vertical segment newly added to the window, is added to the previously computed MPC value and V(x−wx−1,y,d), a V value for a vertical segment excluded from the window, is subtracted from the previously computed MPC value.

Similarly, for values of y greater than wy, V(x,y,d) can be computed without redundancies in the vertical direction. P(x,y+wy,d) indicating matching between pixels added to the vertical segment is added to the previously computed V value, V(x,y−1,d), stored in the V buffer, and P(x,y−1−wy,d) indicating matching between pixels excluded from the vertical segment is subtracted from V(x,y−1,d).

In summary, after initializing the V buffers with the V values for vertical segments centered at each pixel in the (wy)th row and initializing the MPC buffer with the MPC value for a (wx)th pixel in a row, other MPC values may be determined without redundant operations, as indicated by Equations (3) and (6). In doing this, search range for each pixel should be identical. For a pixel in the reference image R(x,y), if a best matching pixel among all the pixels of the search image in the search range is L(x+$d_{max}$, y), $d_{max}$ is the stereo disparity for R(x,y).

Figure 5:
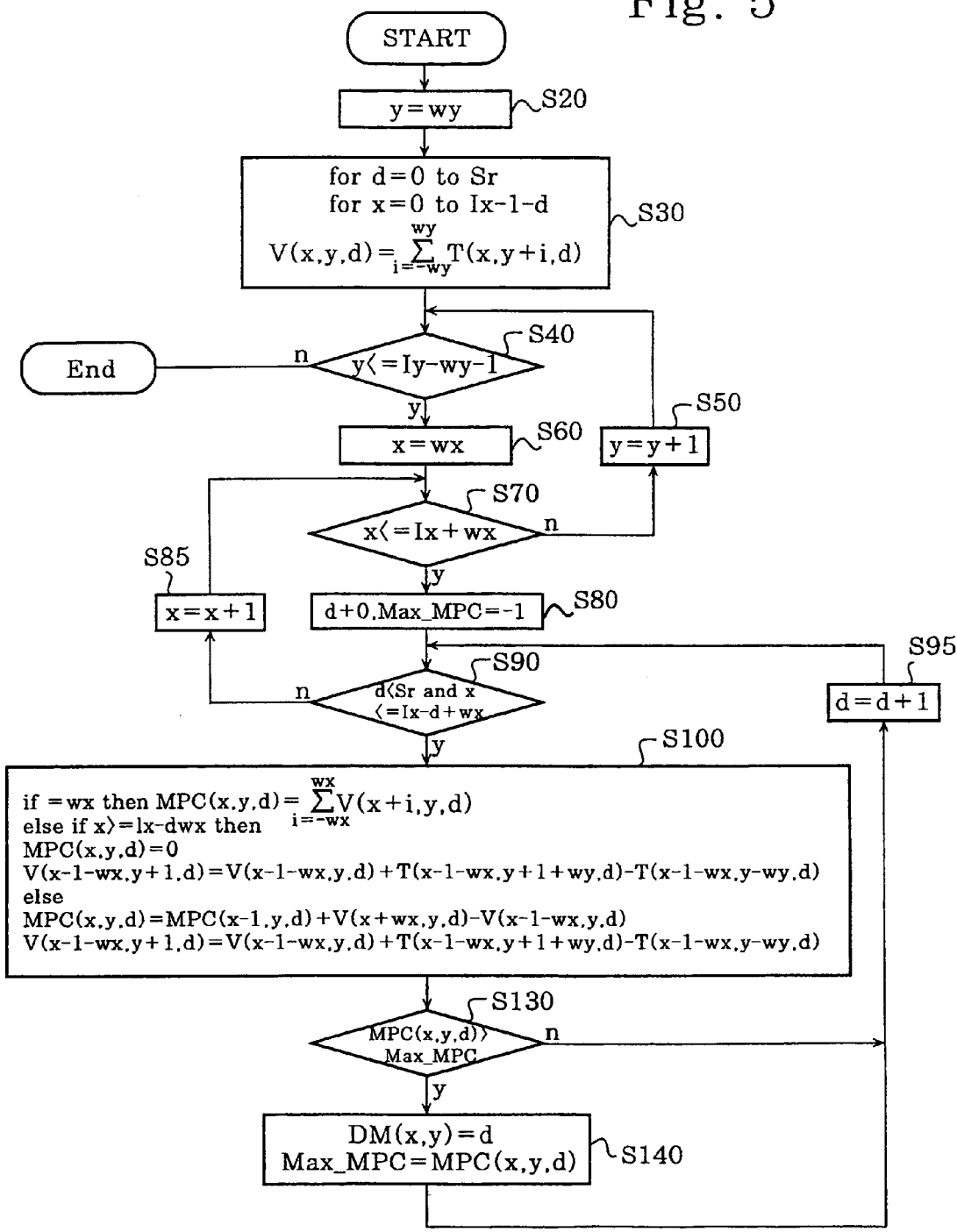
FIG. 5 is a flow chart for determining the MPC similarity measure in accordance with an embodiment of the present invention.

FIG. 5 illustrates the MPC matching algorithm without redundancies for implementing the above equations in an efficient manner. Inputs to this algorithm are: I) the intensity values of pixels R(x,y) and L(x,y) in the reference and search images, respectively, where x ranges from 0 to Ix−1 and y ranges from 0 to Iy−1; ii) Wx and Wy representing the size of a matching window, Wx, Wy being odd integers; and iii) the search range Sr. An output from this algorithm is a disparity map containing a disparity for each pixel, DM(x, y), where x ranges from wx to Ix−wx and y ranges from wy to Iy−wy.

In Step S20, y is initialized to wy. Then, in Step S30, initial V values, V(x, wy, d) for x=0 to Ix−1, d=0 to Sr, are computed and the results are stored in the V buffers. Since the x coordinate of a pixel cannot exceed Ix−1 and R(x+d, y) is used in the computation, x ranges from 0 to Ix−1−d, instead of Ix−1.

In Step S100, the MPC values are either initialized or updated, depending on the value of x, and the V values are updated. This step is executed for each value of x, y and d (x=wx to Ix+wx, y=wy to Iy−wy−1, d=0 to Sr). If x=wx, Equation (3) is executed to generate the first MPC value in the row. If the value of x is less than Ix−d−wx and greater than wx, Equations (3) and (6) are executed. If x is greater than or equal to Ix–d–wx, only the V values are updated. After y is incremented, the V values updated in S100 are used to compute the MPC values for the next row.

Steps S40, S50, S60, S70, S80, S90, and S95 repeat Step S100 for the given ranges of x, y and d.

Steps S130 and S140 determine the value of d that yields the greatest MPC value as the disparity for the reference pixel. After all the steps have been completed, a depth map DM(x,y) (for x=wx to Ix–wx, y=wy to Iy–wy) is obtained.

Figure 6:
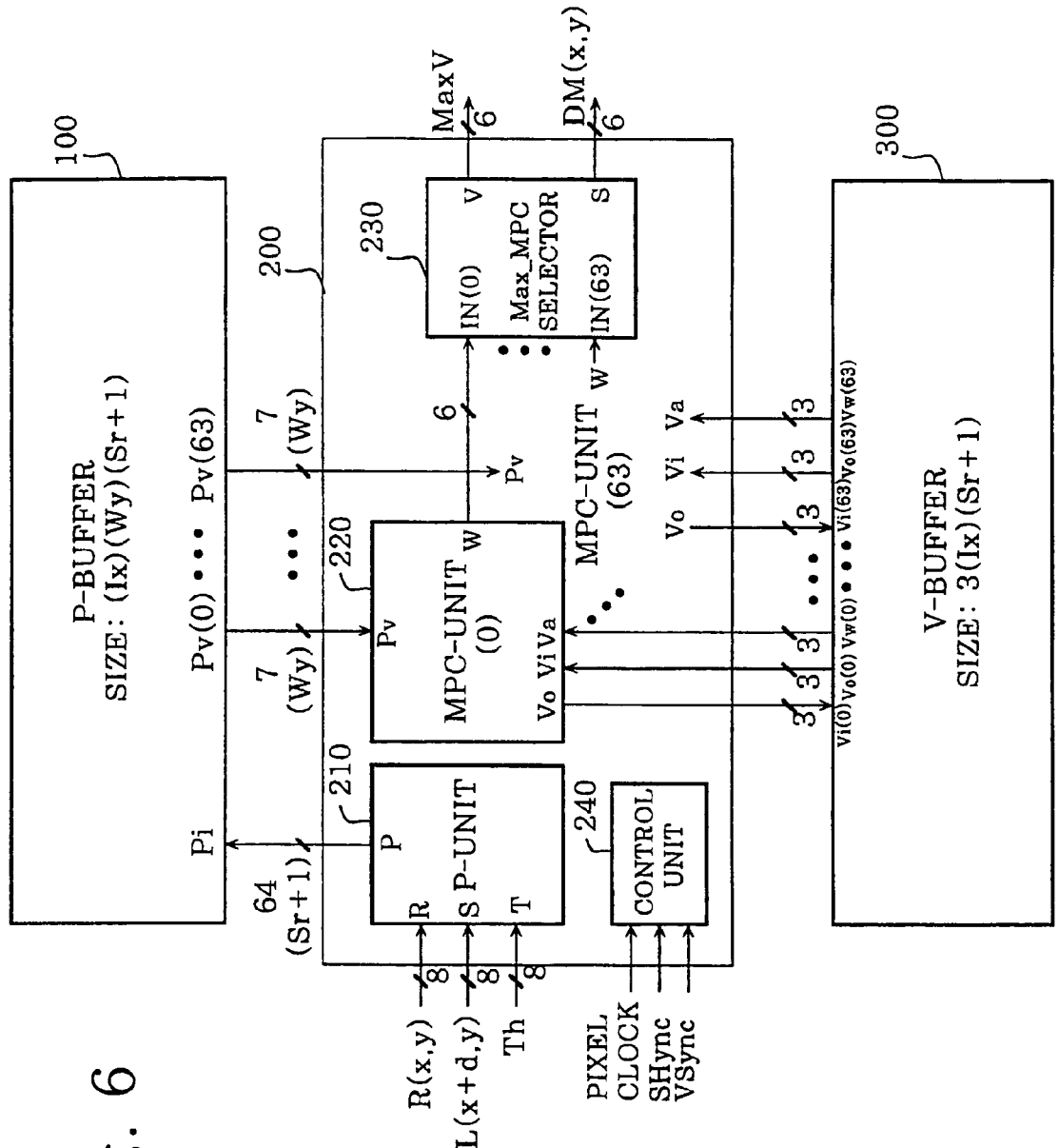
FIG. 6 shows an apparatus for determining a disparity map D(x,y) in accordance with an embodiment of the present invention.

FIG. 6 illustrates an apparatus for determining the disparity values in accordance with the present invention. The apparatus includes a P-buffer 100, an MPC processor 200 and a V-buffer 300 in which Wx and Wy are set to seven, so that the size of a window is 7×7, and Sr is set to 63. Inputs to the apparatus are pixel values of the reference and search images and Th for determining whether two pixels are similar. Synchronization signals, HSync and VSync are also input to the apparatus. Outputs from this apparatus are the maximum MPC(x,y,d) value (MaxV) for pixel R(x,y) in the reference image and disparity DM(x,y) which yields the maximum MPC value.

The MPC processor 200 includes a P-unit 210, MPC-units 220, a Max_MPC selector 230 and a control unit 240. The MPC processor 200 includes (Sr+1) MPC units 220, so that for each reference pixel R(x, y), (Sr+1) MPC values for a search range are computed in parallel. Pixel values R(x,y) and L(x+d,y) are fed to the P-unit 210, where P(x,y,d) is determined according to Equation (1). In the P-unit 210, (Sr+1) P(x,y,d)-values for a given (x,y) (d=0 to Sr) are determined in parallel. The P-values are provided to the P-buffer 100 and stored therein.

The P values stored in the P-buffer 100 are coupled to the (Sr+1) MPC-units 220, where MPC(x,y,d) and V(x,y,d) are computed. A vector Pv(d), a set of P values for a same d value, are input to the MPC-units 220 from the P-buffer 100 V(x,y,d) computed at the MPC units 220 (Vo in the figure) is input to the V-buffer 300 and stored therein. Each of the MPC-units 220 computes the MPC value for each d by using a V value computed therein and V values retrieved from the V-buffer 300. To do this, Va and Vi, V values for vertical segments added to and excluded from a matching window, respectively, are provided from the V-buffer 300 to each of the MPC-units 220.

Max_MPC selector 230 receives (Sr+1) MPC values for a pixel R(x,y) from the MPC-units 220 and determines a largest one (MaxV) to provide DM(x, y).

Figure 7A:
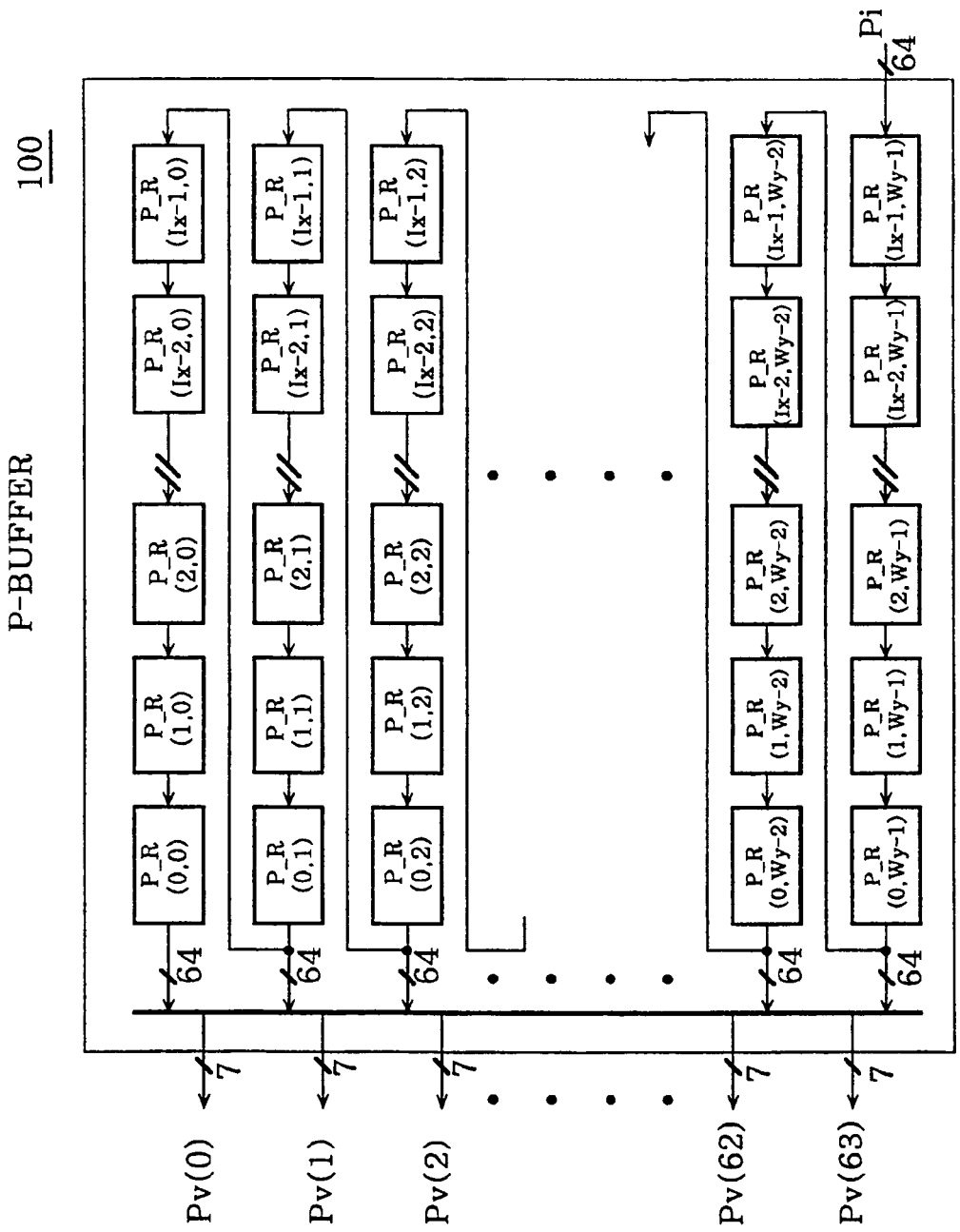
FIG. 7A illustrates the internal structure of the P-buffer of the apparatus shown in FIG. 6.

FIG. 7A illustrates the internal structure of the P-buffer 100, which includes (Sr+1) parallel (Ix*Wy) bit shift registers. The P-buffer stores the P(x,y,d) values (identified as Pi in the figure) provided from the P-unit 210 in the MPC processor 200 and timely provides them to the (Sr+1) MPC-units 220. Each of the blocks identified as P_R(x,y) stores 64 (i.e., (Sr+1)) 1-bit P(x,y,d)-values and the P(x,y, d)-values are shifted in synchro-nization with a system clock, as indicated by the arrows. In FIG. 7A, each row of blocks corresponds to a row of an image and each column of blocks corresponds to a vertical segment in a window (i.e., Wy consecutive pixels in a column). Thus, P(x,0,d) to P(x,Wy–1,d) P-values for pixels included in the same vertical segment are provided from the left part of the P-buffer 100, where each of P(x,0,d) to P(x,Wy–1,d) represents 64 P-values (either 0 or 1) for d=0 to 63. These values are realigned according to the d values into Sr+1 Pv(d) so that Wy (in this example, 7) P values for a same d constitute a vector Pv(d). Since the P-buffer 100 is constructed with shift registers, desired results are provided when the registers are fully occupied by P values, that is, Ix*Wy clocks after a data is first fed to the P-buffer. Then, Pv(d)s are provided from the P-buffer 100 consecutively. Each Pv(d) from the P-buffer 100 is fed back to each MPC-unit in the MPC processor 200 to be used in computing V.

Figure 7B:
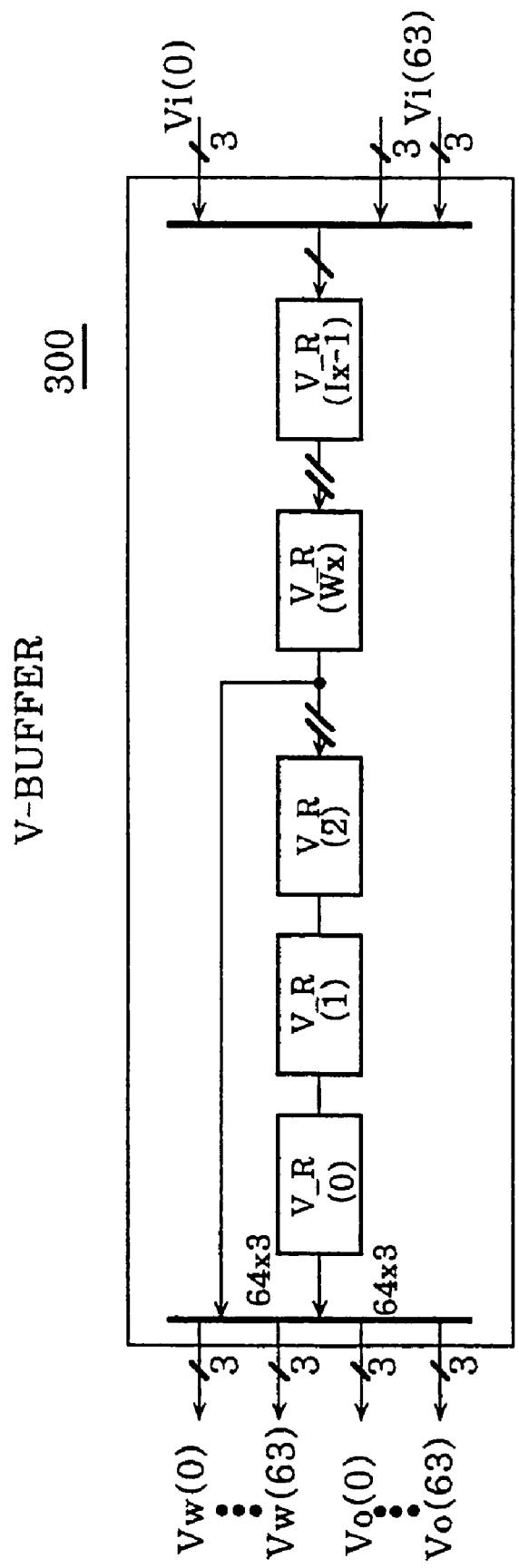
FIG. 7B illustrates the internal structure of the V-buffer of the apparatus shown in FIG. 6.

FIG. 7B shows the internal structure of the V-buffer 300. The V-buffer 300 temporarily stores V(x,y,d) values which are computed at the (Sr+1) MPC-units 220. Each block identified as V_R(I) stores 64 (d=0 to 63) 3-bit V(x,y,d) values. The data in each block is shifted to a next block in synchronization with a clock signal. Data Stored in V_R (Wx) and V_R(0) are provided as outputs from the V-buffer 300, which correspond to V values for vertical segments added to and subtracted from a matching window, respectively. In other words, each of Vw(0) to Vw(63) represents a V value for a vertical segment added to a window for d=0 to 63 in the computation of MPC. Similarly, each of Vo(0) to Vo(63) represents a V value for a vertical segment excluded from a window for d=0 to 63. The V-buffer 300 also has initial delay of (Ix-Wx) clock cycles. Outputs from the V-buffer 300 are provided to the MPC-unit 220 to be used in computing MPC values according to Equation (3).

Figure 8A:
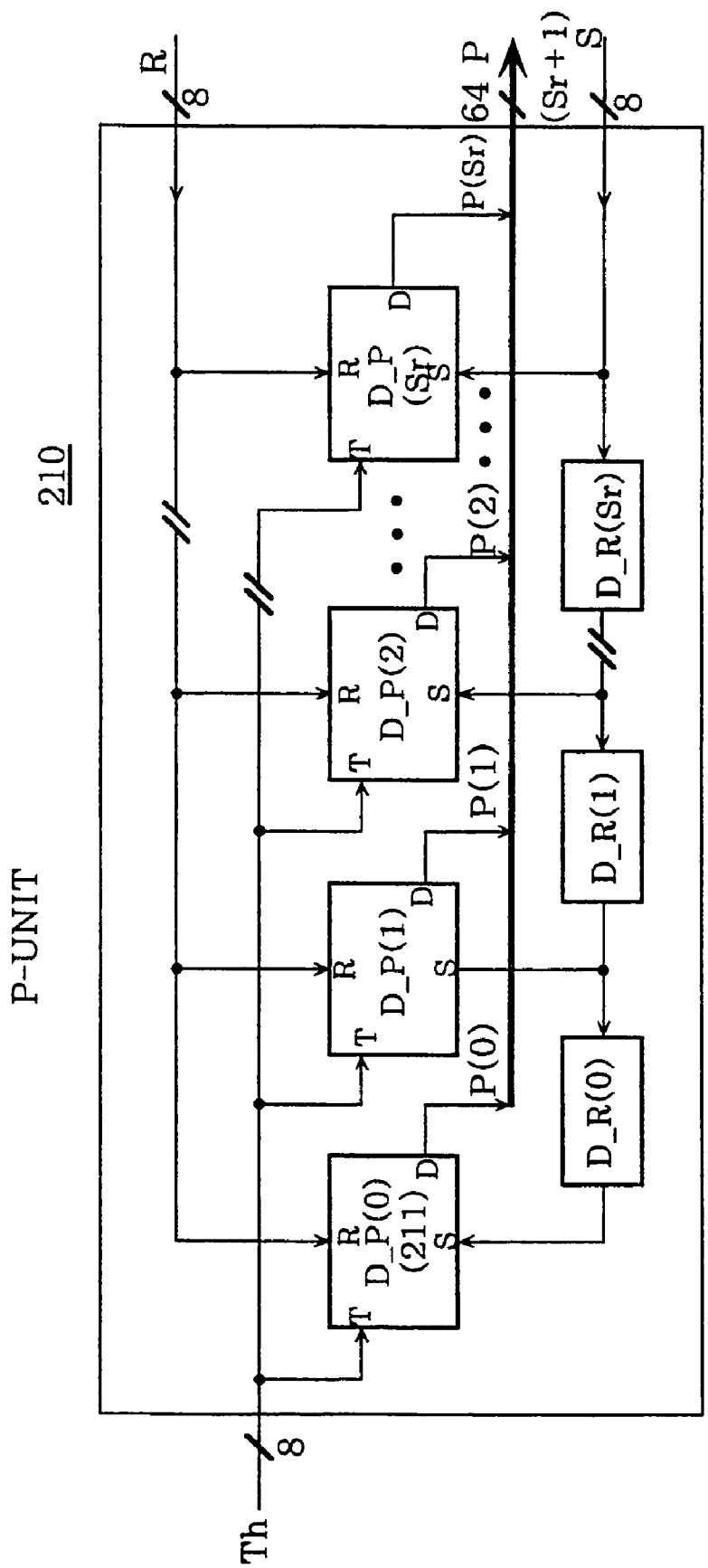
FIG. 8A illustrates the internal structure of the P-unit of the apparatus shown in FIG. 6

FIG. 8A shows an internal structure of the P-unit 210 included in the MPC-processor 200. Inputs to the P-unit 210 are R, S and Th where R and S denote pixel values of reference and search images, and Th denotes the threshold for determining P(x,y,d). Assuming that a pixel value ranges from 0 to 255($2^8$–1), 8 bits are assigned to each R and S input. The P-unit 210 receives (Sr+1) pixel values in a search image for each pixel in a reference image and determines P(x,y,d) for them. A processing unit denoted as D_P(d), d=0 to Sr, determines P(x,y,d) for the reference pixel (i.e., the pixel in the reference image) and a pixel in the search image displaced from the reference pixel by d.

Figure 8B:
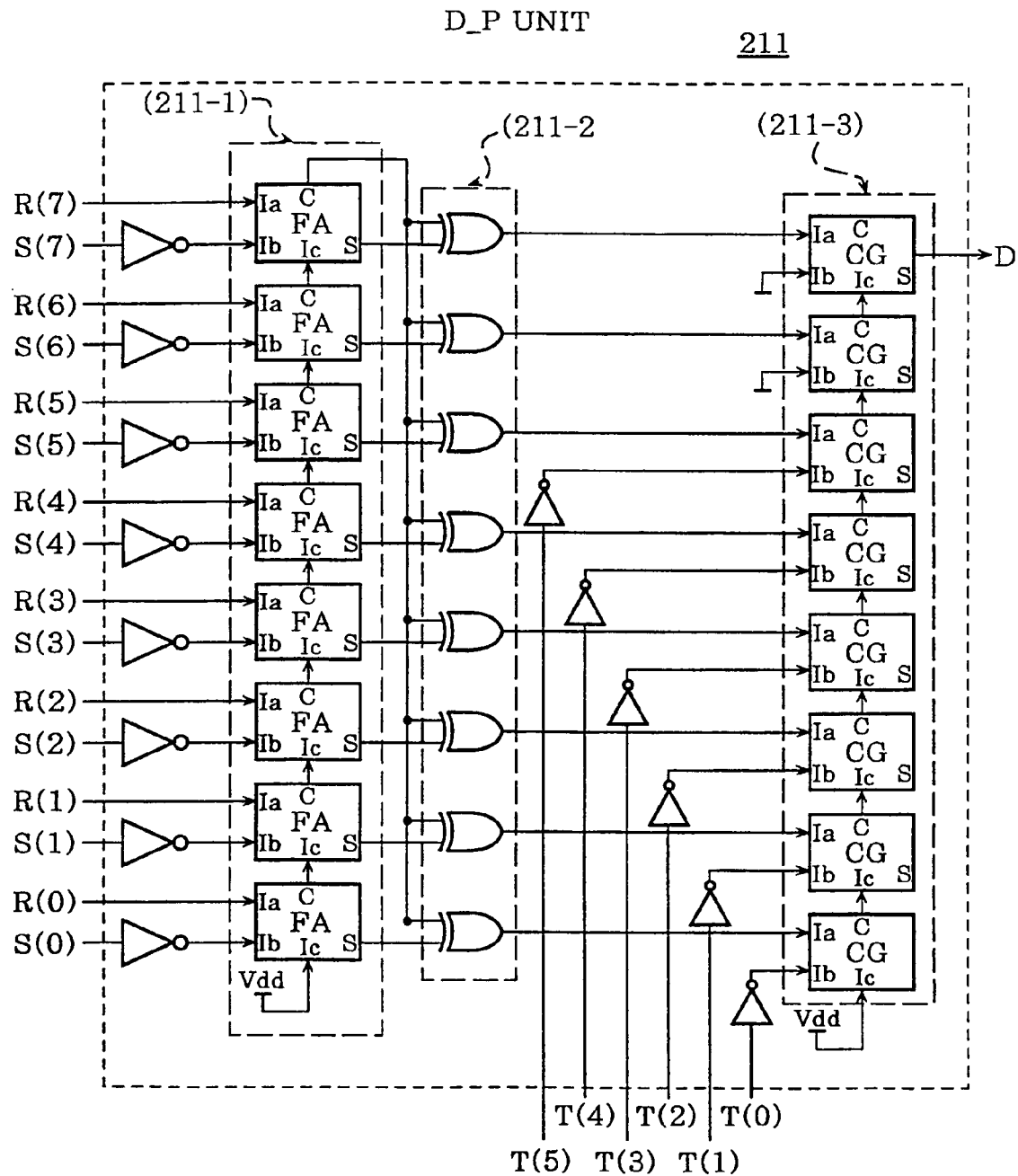
FIG. 8B is a circuit diagram of the D_P unit of the P-unit illustrated in FIG. 8A.

FIG. 8B is a circuit diagram of the D_P unit 211. Full adders (FA) 211-1 in the left part subtract S from R. Carry generators (CG) 211-3 in the right part provide a carry, denoted as D, depending upon the sign of (Th–abs(R–S). If Th is greater than the absolute value of (R–S), D is 1. If (R–S), the input to the XOR gates 211-2, is a positive number, the 2's complement of the inputs (i.e., –(R–S)) is provided by the gates 211-2. If (R–S) is a negative number, (R–S) is provided by the XOR gates, so that the absolute value of (R–S) can be subtracted from Th. Since there are (Sr+1) D_P(d) units 211 in the P_units 210, (Sr+1) P(x,y,d) values may be calculated in parallel. In the P-unit 210 shown in FIG. 8A, a pixel value in a reference image is used only once, while a pixel value in the search image is used (Sr+1) times as it is shifted through D_R(d). D_R(d) denotes the registers that store pixel values of the search image. A pixel value in each D_R(d) is shifted left on each clock. As the P-unit 210 includes the shift registers, it provides an output continuously after an initial delay of (Sr+1) clock cycles.

Figure 9:
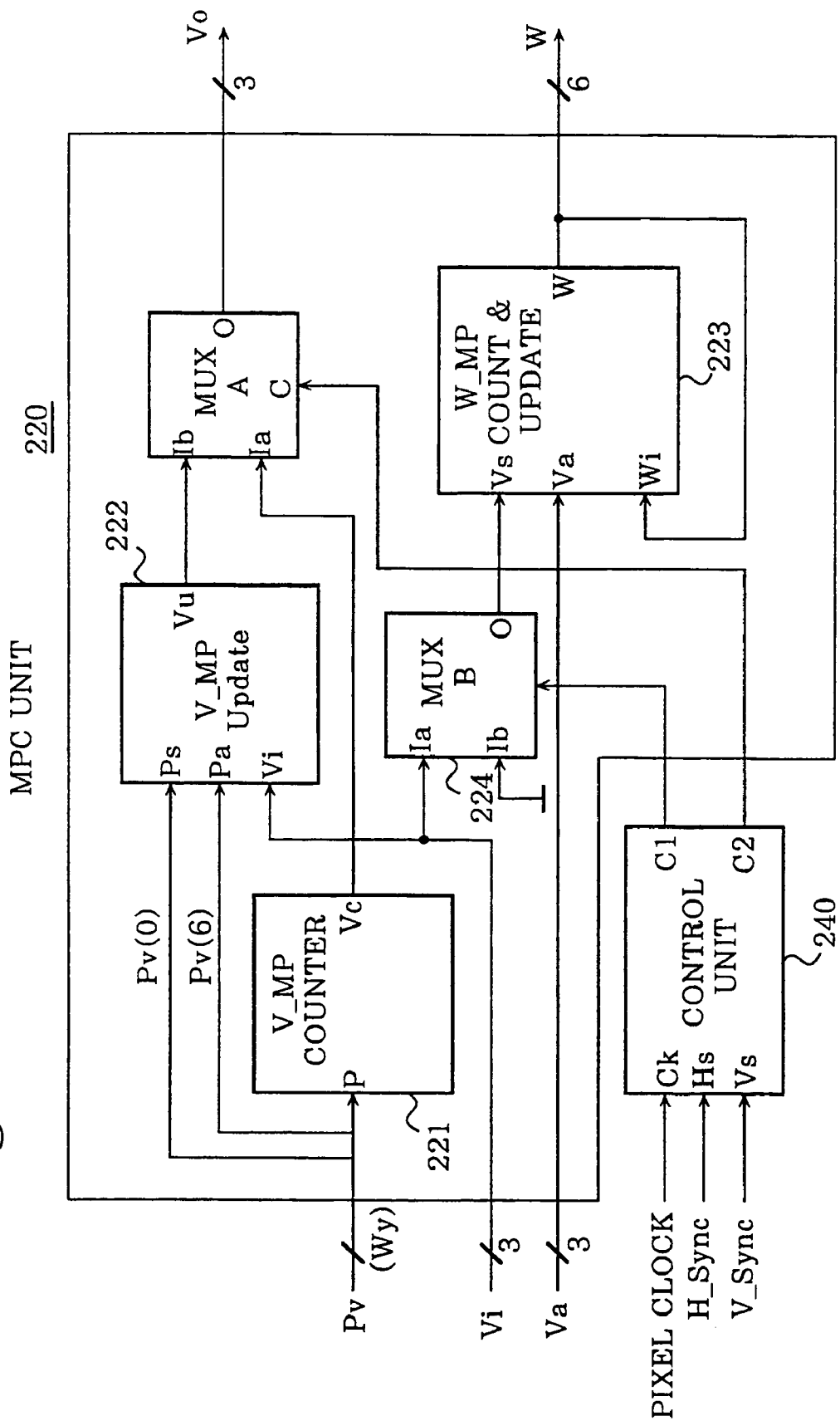
FIG. 9 illustrates the internal structure of one of the MPC-units of the apparatus shown in FIG. 6.

FIG. 9 illustrates the internal structure of the MPC-unit 220 in the MPC processor 200. The MPC-unit 220 is divided by its function into a V_MP counter 221 and a V_MP update unit 222 for calculating V(x,y,d) according to Eqs. (5) and (6), respectively, and a W_MP count and update unit 223 for calculating MPC(x,y,d) according to Eqs. (2) and (3). The V_MP counter 211 is used to provide V(x,y,d) by summing P values inputted in an initial stage of the disparity map computation. After the initial stage, V (denoted as Vi in the figure) is provided to the V_MP update unit 222 from the V-buffer 300. Then, V_MP update unit 222 calculates V(x, y,d) without redundant operation.

Figure 10:
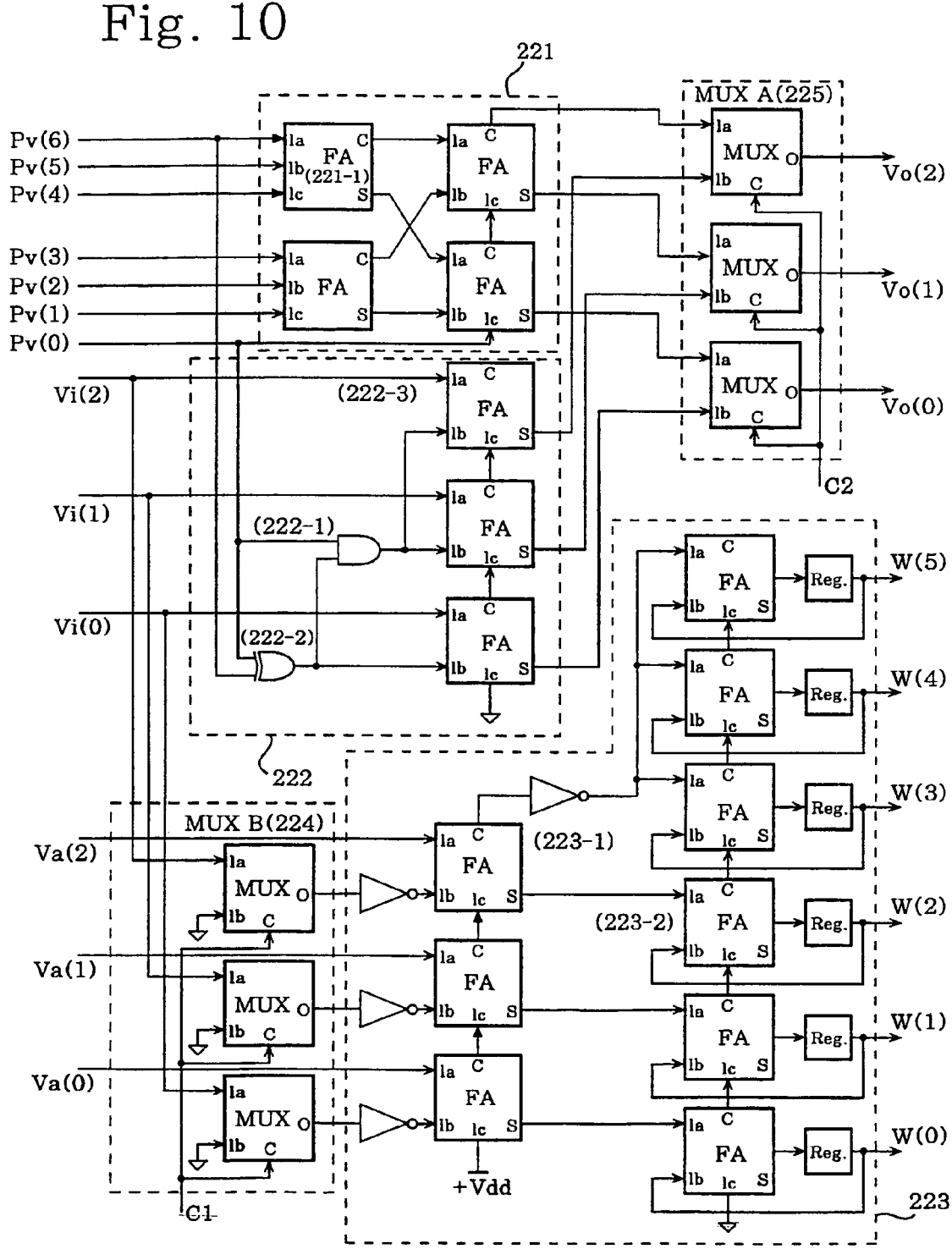
FIG. 10 is a logic diagram of the MPC-unit whose internal structure is illustrated in FIG. 9.

FIG. 10 depicts a logic diagram of the MPC-unit 220. The V_MP counter 221 receives Wy P values in an initial stage, adds them at four full adders (FAs) included in the V_MP counter 221, thereby providing a 3-bit binary number V(x, y,d). This 3-bit value (Vo(2), Vo(1), Vo(0)) is provided to the V-buffer 300 through a MUX A 225. C2 control input makes the MUX A 225 select an output from the V_MP counter 221 until an output from the V_MP update unit 222 becomes valid. V(x,y,d) values input to the V-buffer 300 are provided to the Va input port of the MPC-unit 220 after (Ix−Wx) clock cycles and to the Vi input port after Ix clock cycles. V_MP update unit 222 begins to calculate V(x,y,d) without redundancy according to Equation (6) by adding one to Vi or subtracting one from Vi at the full adders 222-3, depending on the values of Pv(0) and Pv(6). Specifically, if Pv(0) is equal to Pv(6), 0 (000 in binary) is added to Vi; Pv(0) is 1 and Pv(6) is 0, −1 (111 in binary) is added to Vi; and Pv(0) is 0 and Pv(6) is 1, 1 (001 in binary) is added to Vi. Then, the C2 control input enables the MUX A 225 to select the outputs from the V_MP update unit 222.

Vi and Va, provided from the V-buffer 300 to the MPC-unit 220, are used to calculate MPC values according to Equations (2) and (3). Full adders 223-1 on the left part of the W_MP count and update unit 223 calculate Va−Vi. The result is added to a previous MPC value in the adders 223-2 on the right part of the W_MP count and update unit 223 in order to provide an updated MPC value. MUX B 224 selects 0's and provides them to the W_MP count and update unit 223 until Vi from the V-buffer 300 becomes valid. As a result, until Vi becomes valid, only Va values are summed in the unit 223 to provide MPC(wx, y, d) according to Equation (2). After Vi from the V-buffer becomes valid, MPC is calculated according to Equation (3).

Figure 11:
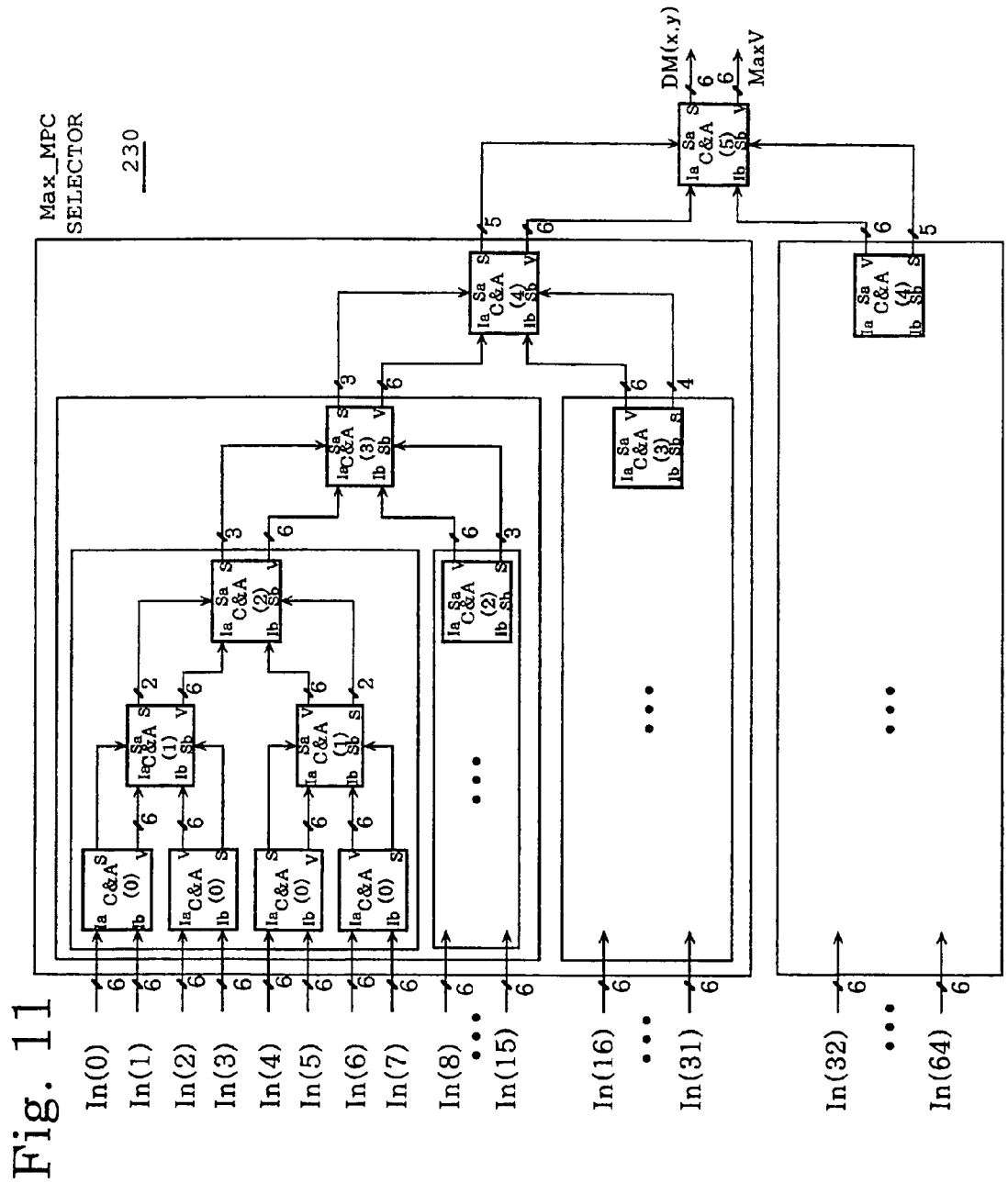
FIG. 11 illustrates the internal structure of the Max_MPC selector of the apparatus shown in FIG. 6.

FIG. 11 shows the internal structure of the Max_MPC selector 230 included in the MPC-processor 200 in FIG. 6. The Max_MPC selector 230 compares MPC values provided from the (Sr+1) MPC-units 220, selects a maximum value MaxV and provides a displacement DM(x,y) corresponding to the maximum value. Basic units for constructing the Max_MPC selector 230 are C&A(n) cells 231 each of which compares its inputs and provides the larger one and its location information.

Figure 12:
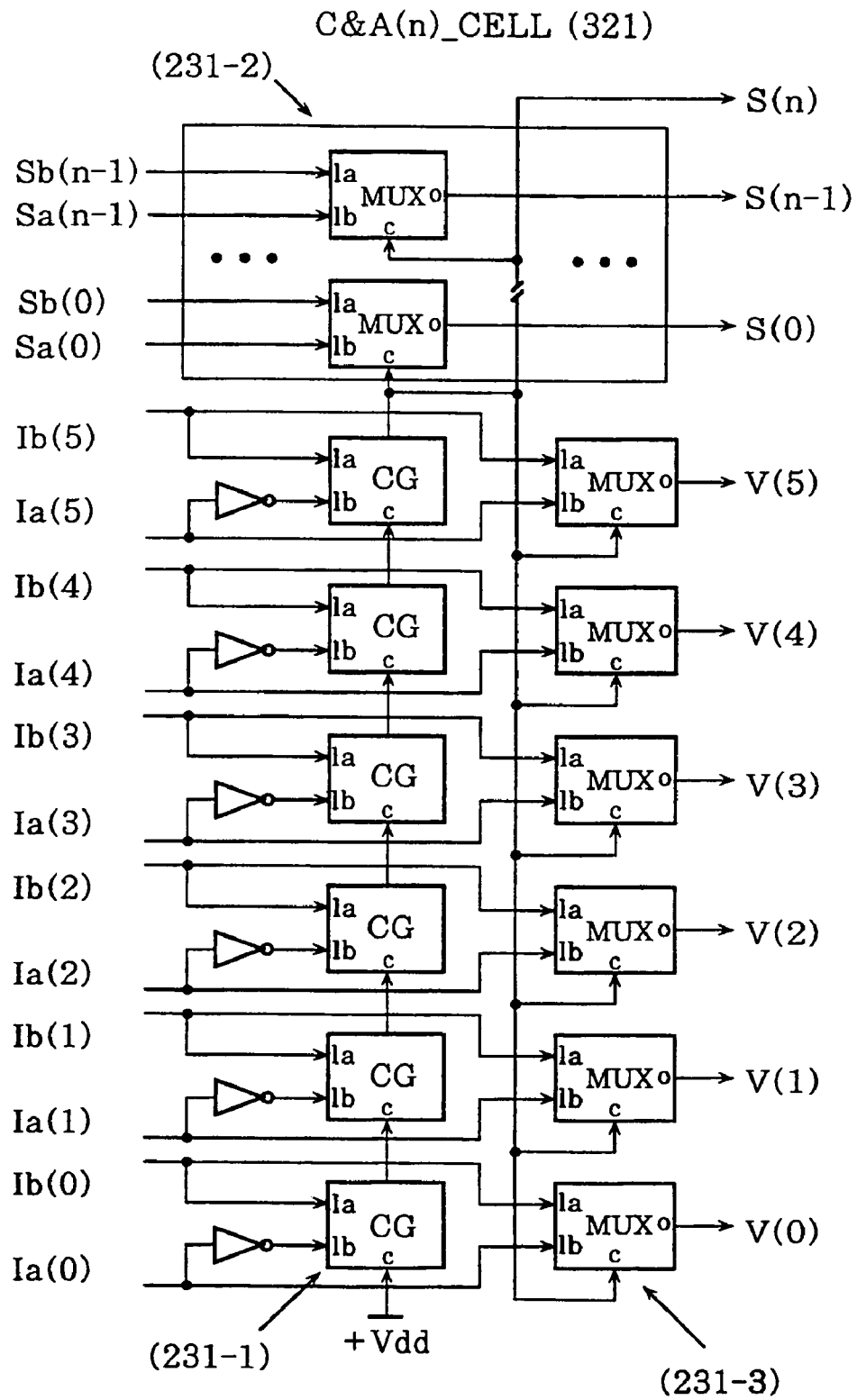
FIG. 12 is a logic diagram of the C&A(n) cell of the apparatus shown in FIG. 11.

FIG. 12 is a logic diagram of the C&A(n) cell. In the C&A cell 231, carry generators 231-1 provides 0 if Ib is smaller than Ia and 1 otherwise so that MUXes 231-3 select and provide the larger value. MUXes 231-2 produce the location information (S(n), . . . , S(0)) corresponding to the larger value in response to the location information from a previous stage, i.e., C&A(n−1), and the carry value. The number of MUXes in the C&A cell varies depending on n, that is, the number of MUXes 231-2 is n. The MUXes 231-2 select one between Sa and Sb, the location information of a previous stage. In FIG. 11, going further to the right, number of bits inputted as Sa and Sb to C&A cell increases. The output from the C&A cell of the last stage is a maximum MPC value for a given pixel R(x,y) and its disparity.

While the present invention has been described in terms of particular embodiments, it will be apparent to those of ordinary skill in the art that various changes and modifications may be made without departing from the spirit and scope of the invention defined in the following claims.

The invention claimed is:

1. A method of determining a stereo disparity between a reference image and a search image for a reference pixel in the reference image, said method comprising the steps of:
(a) calculating a similarity measure between a reference window include a set of pixels centering on the reference pixel and each of a group of search windows in the search image which is of a same shape with the reference window and displaced from the reference window within a predetermined search range, wherein a matching pixel count, which is the number of pixels in the reference window which are similar in intensity to corresponding pixels in a search window, is used as the similarity measure between the reference window and said search window; and
(b) determining a displacement between the reference window and a search window which yields a largest similarity measure as the stereo disparity for the reference pixel,
wherein R(x,y) represents the reference pixel, the reference window include Wx*Wy pixels centering on R(x,y), Wx and Wy being predetermined numbers, each of the search windows includes Wx*Wy pixels centering on L(x+d, y) which is a pixel in the search image, d ranging from 0 to a predetermined number Sr, and
said step (a) includes:
(a1) calculating P(x,y,d) values as follows:
P(x,y,d)=1, if abs $(B_R(x,y)-B_L(x+d,y)) \leq$ Th
=0, otherwise,
where $B_R(x,y)$ and $B_L(x,y)$ represent intensity values of R(x,y) and L(x+d, y) and Th is a predetermined threshold; and
(a2) determining MPC(x,y,d) values for d=0 to Sr as follows:

$$MPC(x, y, d) = \sum_w P(x, y, d)$$

wherein w represents the reference window and the search window centering on L(x+d, y); and
said step (b) include selecting a d value which yields a largest MPC(x,y,d) value as the stereo disparity for R(x,y).

2. An apparatus for determining a stereo disparity between a reference image and a search image for a reference pixel in the reference image, said apparatus comprising:
(a) first means for calculating a similarity measure between a reference window including a set of pixels centering on the reference pixel and each of a group of search windows in the search image which is of a same shape with the reference window and displaced from the reference window within a predetermined search range, wherein a matching pixel count, which is the number of pixels in the reference window which are similar in intensity to corresponding pixels in a search window, is used as the similarity measure between the reference window and said search window; and
(b) second means for determining a displacement between the reference window and a search window which yields a largest similarity measure as the stereo disparity for the reference pixel,
wherein R(x,y) represents the reference pixel, the reference window includes Wx*Wy pixels centering on R(x,y), Wx and Wy being predetermined numbers, each of the search windows includes Wx*Wy pixels centering on L(x+d, y) which is a pixel in the search image, d ranging from 0 to a predetermined number Sr, and
said first means includes:

(a1) a P-unit for calculating P(x,y,d) values as follows:

P(x,y,d)=1, if abs($B_R$(x,y)−$B_L$(x+d, y))≦Th

=0, otherwise, where $B_R$(x,y) and $B_L$(x+d, y) represent intensity values of R(x,y), and L(x+d, y) and Th is a predetermined threshold value;

(a2) a P-buffer for storing P(x,y,d) values from said P-unit;

(a3) third means for determining MPC(x,y,d) values for d=0 to Sr as follows:

$$MPC(x, y, d) = \sum_{w} P(x, y, d)$$

wherein w represents the reference window and the search window centering on L(x+d, y); and said second means includes means for selecting a d value which yields a largest MPC(x,y,d) value as the stereo disparity for R(x,y).

3. An apparatus as defined in claim 2, wherein said third means includes (Sr+1) MPC-units, each of which determines MPC(x,y,d) for each d value.

4. An apparatus as defined in claim 3, wherein each of said MPC-units includes:

means for determining V(x,y,d) values which is represented as follows:

$$V(x, y, d) = \sum_{i=-wy}^{wy} P(x, y+i, d)$$

wherein wy is (Wy−1)/2;

means for generating a MPC(x,y,d) value by using V(x, y,d) values as follows:

$$MPC(x, y, d) = \sum_{i=-wx}^{wx} P(x+1, y, d), \text{ if } x = wx \text{ and}$$

MPC(x,y,d)=MPC(x−1,y,d)+V(x+wx,y,d)−V(x−1−wx,y, d), if x>wx, where wx is (Wx−1)/2.

5. An apparatus as defined in claim 4, further comprising a V-buffer for storing the V(x,y,d) values from said V determining means and providing the stored V(x,y,d) values to said MPC generating means.

6. An apparatus as defined in claim 5, wherein said V determining means includes:

a V_MP counter for determining V(x,y,d) values by summing P values as follows:

$$V(x, y, d) = \sum_{i=-wy}^{wy} P(x, y+i, d)$$

A V_MP update unit for determining V(x,y,d) values by using V(x,y−1, d) and P values as follows:

V(x,y,d)=V(x,y−1,d)+P(x,y+wy,d)−P(x,y−1−wy,d); and a multiplexor for selectively providing the V(x,y,d) value from the V_MP counter if y−wy and the V(x,y,d) value from the V)MP update unit if y≧wy; and said MPC generating means includes:

a W_MP count and update unit for generating a MPC (x,y,d) value by using V(x,y,d) values; and a multiplexor for selectively providing V(x,y,d) values from the V-buffer or 0 to the W_MP count and update unit as the V(x−1−wx,y,d) value.

7. An apparatus as defined in claim 6, wherein said V_MP counter includes a plurality of full adders;

said V_MP update unit includes:

logic gates for providing P(x,y+wy,d)−P(x,y−1−wy,d); and full adders for adding the output from the logic gates to V(x,y−1,d), thereby providing V(x,y,d); and said W_MP count and update unit includes:

means for deciding V(x+wx,y,d)−V(x−1−wx,y,d); and means for adding the output from said deciding means to MPC(x−1,y,d).

8. An apparatus as defined in claim 2, wherein said P-unit includes:

(Sr+1) D_R units each of which stores L(x+d, y) values for each d; and (Sr+1) D_P units which provides (Sr+1) P(x,y,d) values for d=0 to Sr simultaneously in response to R(x,y) and (Sr+1) L(x+d, y) values from the D_R units.

9. An apparatus as defined in claim 8, wherein the D_P unit includes:

means for calculating ($B_L$(x+d,y)−$B_R$(x,y)) which includes a plurality of full adders;

means for calculating an absolute value of ($B_L$(x+d,y)−$B_R$(X,Y)) which includes a plurality of exclusive OR gates; and means for subtracting the absolute value from Th and providing 0 or 1 depending on the result of the subtraction, which includes a plurality of carry generators.

10. An apparatus as defined in claim 2, further comprising means for selecting a largest one among the MPC(x,y,d) values for R(x,y) and providing a d value yielding the largest MPC value as the disparity for R(x,y).

11. An apparatus as defined in claim 2, where said P-buffer includes means for storing Ix*Wy*(Sr+1) P values, wherein Ix is the number of pixels in a row in the reference and the search image.

12. An apparatus as defined in claim 5, where said V-buffer includes means for storing Ix*(Sr+1) V values, wherein Ix is the number of pixels in a row in the reference and the search image.

* * * * *